United States Patent [19]

Coops

[11] Patent Number: 5,118,343
[45] Date of Patent: Jun. 2, 1992

[54] LITHIUM METAL REDUCTION OF PLUTONIUM OXIDE TO PRODUCE PLUTONIUM METAL

[75] Inventor: Melvin S. Coops, Livermore, Calif.

[73] Assignee: The United States of America as represented by the United States Department of Energy, Washington, D.C.

[21] Appl. No.: 689,423

[22] Filed: Apr. 23, 1991

[51] Int. Cl.⁵ .............................................. C22C 28/00
[52] U.S. Cl. .......................................... 75/396; 75/397
[58] Field of Search ....................... 75/396, 397; 420/2

[56] References Cited

U.S. PATENT DOCUMENTS

| | | | |
|---|---|---|---|
| 2,758,023 | 8/1956 | Bareis | 75/84.1 |
| 2,894,832 | 7/1959 | Magel | 75/397 X |
| 2,968,547 | 1/1961 | Lyon et al. | 75/397 |
| 3,029,142 | 4/1962 | Coffinberry | 75/396 X |
| 3,063,829 | 11/1962 | Reavis et al. | 75/397 |
| 3,147,109 | 9/1964 | Knighton et al. | 75/396 X |
| 3,169,057 | 2/1965 | Knighton et al. | 75/396 |
| 3,328,017 | 6/1967 | Conner | 266/39 |
| 3,442,642 | 5/1969 | Ramsey et al. | 75/84.1 |
| 3,619,178 | 11/1971 | Felt | 75/84.1 |
| 3,666,443 | 5/1972 | Connor | 75/397 |
| 3,804,939 | 6/1972 | Strickland et al. | 75/396 X |
| 4,032,328 | 6/1977 | Hurd | 75/397 |
| 4,814,046 | 3/1989 | Johnson et al. | 420/2 X |
| 4,995,948 | 2/1991 | Poa et al. | 204/1.5 |

Primary Examiner—Brooks H. Hunt
Assistant Examiner—Daniel J. Jenkins
Attorney, Agent, or Firm—Henry P. Sartorio; L. E. Carnahan; William R. Moser

[57] ABSTRACT

A method is described for the chemical reduction of plutonium oxides to plutonium metal by the use of pure lithium metal. Lithium metal is used to reduce plutonium oxide to alpha plutonium metal (alpha-Pu). The lithium oxide by-product is reclaimed by sublimation and converted to the chloride salt, and after electrolysis, is removed as lithium metal. Zinc may be used as a solvent metal to improve thermodynamics of the reduction reaction at lower temperatures. Lithium metal reduction enables plutonium oxide reduction without the production of huge quantities of CaO—CaCl₂ residues normally produced in conventional direct oxide reduction processes.

12 Claims, 2 Drawing Sheets

LITHIUM METAL REDUCTION OF PLUTONIUM OXIDE TO PRODUCE PLUTONIUM METAL

The United States Government has rights in this invention pursuant to Contract No. W-7405-ENG-48 between the U.S. Department of Energy and the University of California, for the operation of Lawrence Livermore National Laboratory.

FIELD OF INVENTION

The subject invention relates generally to a method for the chemical reduction of plutonium oxides and more particularly to reduction of plutonium oxides with lithium metal to high-purity plutonium metal.

BACKGROUND OF THE INVENTION

Plutonium must be reduced to the metallic state for use in nuclear weapons. The chemical characteristics of plutonium metal limit the chemical processes which are operational for production scale use. Currently, there are two processes which are used for large scale conversion of plutonium oxides to metal. One method is the "bomb-reduction" method (BR), and the other is the direct oxide reduction (DOR) method. These methods suffer from major shortcomings in efficiency and economics, because they each generate significant amounts of waste by-products and require complicated recycle loops of chemical reactions to recover unreduced feedstock materials, the raw material of the chemical process. Additionally, the bomb-reduction process poses a significant problem of exposure of operating personnel to neutrons.

In the bomb-reduction (BR) method for producing plutonium metal, plutonium fluoride ($PuF_4$), is reacted with a reducing metal, commonly a metal such as calcium, to produce the free element and halide slag; that is, Pu metal and $CaF_2$. An alternate method for the production of plutonium metal is direct oxide reduction (DOR), in which plutonium oxide is reacted with calcium and solvent salts, to produce plutonium metal and a large volume of spent salt. An example of this is the reaction of $PuO_2$ with Ca and $CaCl_2$ flux to produce Pu metal and a large volume of salt, $CaO \cdot 11CaCl_2$.

Each of these metal production methods produce waste materials which present considerable health hazards and waste handling problems. These hazards have stimulated the search for alternative methods for producing pure plutonium metal. The BR method presents human health risks due to exposure to $PuF_4$ (alpha, neutron) neutron emission. The DOR method generates large amounts of plutonium-containing waste salts which require secondary processing. The reduction slags and residues of this process may contain as much as 5% of the plutonium contained in the original plutonium feedstock. The $CaO \cdot 11CaCl_2$ reaction product may be dissolved with dilute mineral acids, however the acidic chloride solution from this reaction is especially corrosive and will complicate secondary recovery processes when attempted in ion exchange and solvent extraction equipment fabricated from stainless steel or ferritic alloys.

For more than 30 years, the bomb reduction method (BR) had been the only method available for large scale production of plutonium metal. This basic process includes intitation of a self-propagating exothermic reaction between $PuF_4$ and Ca metal. The $PuF_4$ is obtained by reacting freshly formed $PuO_2$ with either fluorine gas or hydrogen fluoride at elevated temperature in a fluorination reactor. The charge is then placed in an insulated magnesium oxide ceramic crucible which is confined in a pressure-resistant steel vessel. Production workers operating this equipment receive significant exposure to neutron emission during this process. Upon heating and initiation, a highly exothermic reaction takes place within a few seconds. During cooling, liquid metallic plutonium collects in a pool beneath the spent reactants, which may include some remaining $PuF_4$ feedstock. Slag dissolution and chemical recovery of unreduced plutonium fluoride is required, because the reaction rarely goes to completion. Environmental and occupational hazards associated with this process have necessitated an accelerated phase-out of bomb reduction processing for production plant use.

The direct oxide reduction process uses molten calcium as the reducing metal; plutonium oxide ($PuO_2$) is the source of plutonium. The chemical reaction will not propagate unless the reaction by-product, CaO, is removed from the reaction site. Therefore, large quantities of $CaCl_2$ are added as a solvent for the CaO reaction product. The reduction is performed in a magnesium-oxide crucible at 800° C. in an argon atmosphere. Intense mixing is required to maintain continuous contact between the dense $PuO_2$ and the very light Ca. The fine droplets of liquid plutonium metal which are formed gradually coalesce into a pool of plutonium metal at the bottom of the reaction vessel. The liquid-salt phase disengages from the molten plutonium phase and after cooling and solidification, it may be cleaved from the product metal.

Two problems interfere with the usefulness of the DOR method. First, there is insufficient coalescence of all of the fine plutonium droplets during the phase separation period. There may be as much as 5% of the metallic plutonium remaining in the spent salt phase, in the form of either a fine metal dispersion or as unreacted $PuO_2$. Second, the process generates huge volumes of chloride salt residues which are difficult to process due to the corrosive nature of chloride solutions. In situ regeneration of the spent liquid salt phase with either chlorine gas or anhydrous hydrochloric acid has been used for partial recycling of the salt. Gas products of this regeneration method are severely corrosive to gas treatment facilities.

Even under optimal regeneration conditions, there are significant quantities of highly alpha-contaminated chloride salts which must be decontaminated and disposed of as the reprocessing operation proceeds. The reaction produces two moles of CaO, which must be disposed of, for every mole of $PuO_2$ fed into the direct oxide reduction process. In addition to the large amount of waste salt which requires disposal, this salt contains significant amounts of plutonium, as the metal or unreacted oxide. There may be other actinide elements, such as americium (Am) uranium (U), or neptunium (Np), which are natural decay daughters, present in the waste salt as well.

Another problem with the DOR process is that the plutonium product is contaminated with magnesium due to liquid calcium corrosion of the MgO containers used in the process. Magnesium stabilizes plutonium metal in the delta-phase. Alpha-phase metal, which is needed for component fabrication, may be obtained by further electrorefining (ER) the product metal to purify the plutonium. While the electrorefining process provides high-quality alpha-plutonium, this slow and expensive process generates additional plutonium-contaminated salt wastes which also require chemical processing. Because the product of DOR reduction processes is typically delta-phase plutonium, the direct oxide reduction process is usually combined with an electrorefining purification step. The DOR and electrorefining (ER) processes must be combined to produce pure foundry grade plutonium metal. The consolidated reactions of metal production and metal purification makes the direct oxide reduction/electro-refining (DOR/ER) process a very expensive and time consuming method of metal production.

SUMMARY OF THE INVENTION

Accordingly, it is an object of the present invention to provide a method for production of plutonium metal by reaction of plutonium oxides with metallic lithium.

Another object is to provide a method for production of plutonium metal by reaction of plutonium oxide with metallic lithium and regeneration of lithium reductant.

It is an object of the present invention to provide plutonium metal produced by the reaction of plutonium oxide with metallic lithium.

It is another object is to provide plutonium metal produced by reaction of plutonium oxide with metallic lithium and regeneration of lithium reductant.

Another object is to provide a method for production of plutonium metal, by reaction of plutonium oxide with lithium reductant in a zinc metal solvent and regeneration of the lithium metal reductant.

The instant invention describes a method for the chemical reduction of plutonium oxide by reaction with pure lithium metal to produce plutonium metal and lithium oxide, which may be recovered by vacuum sublimation. The recovered lithium oxide from the oxide reduction may be further reclaimed by hydrochlorination and electrolysis. This method enables reduction of plutonium oxide without production of $CaO-CaCl_2$ residues, which are contaminated by plutonium or americium residues. This method is suitable for high-fired plutonium oxides.

The invention further describes a method for the chemical reduction of plutonium oxides in the presence of a solvent metal which improves the reduction thermodynamics controlling the reaction equilibrium.

A method for the production of plutonium metal without the generation of large quantities of hazardous salt waste constitutes a major cost savings in production of plutonium. In the typical DOR processing operations, five times as much mass of $CaCl_2$ is required as $PuO_2$ feedstock. In foundry-scale type operations for Pu production, such chloride salt residues produced could be in excess of 20 tons per year. The described process would result in significant cost savings of the recycling operations for calcium salt residues, which would amount to $50 million annually for the current production level of Pu metal.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

The accompanying drawings, which are incorporated and form a part of the specification, illustrate an embodiment of the invention and, together with the description, serve to explain the principles of the invention.

DETAILED DESCRIPTION OF THE INVENTION

Figure 1:
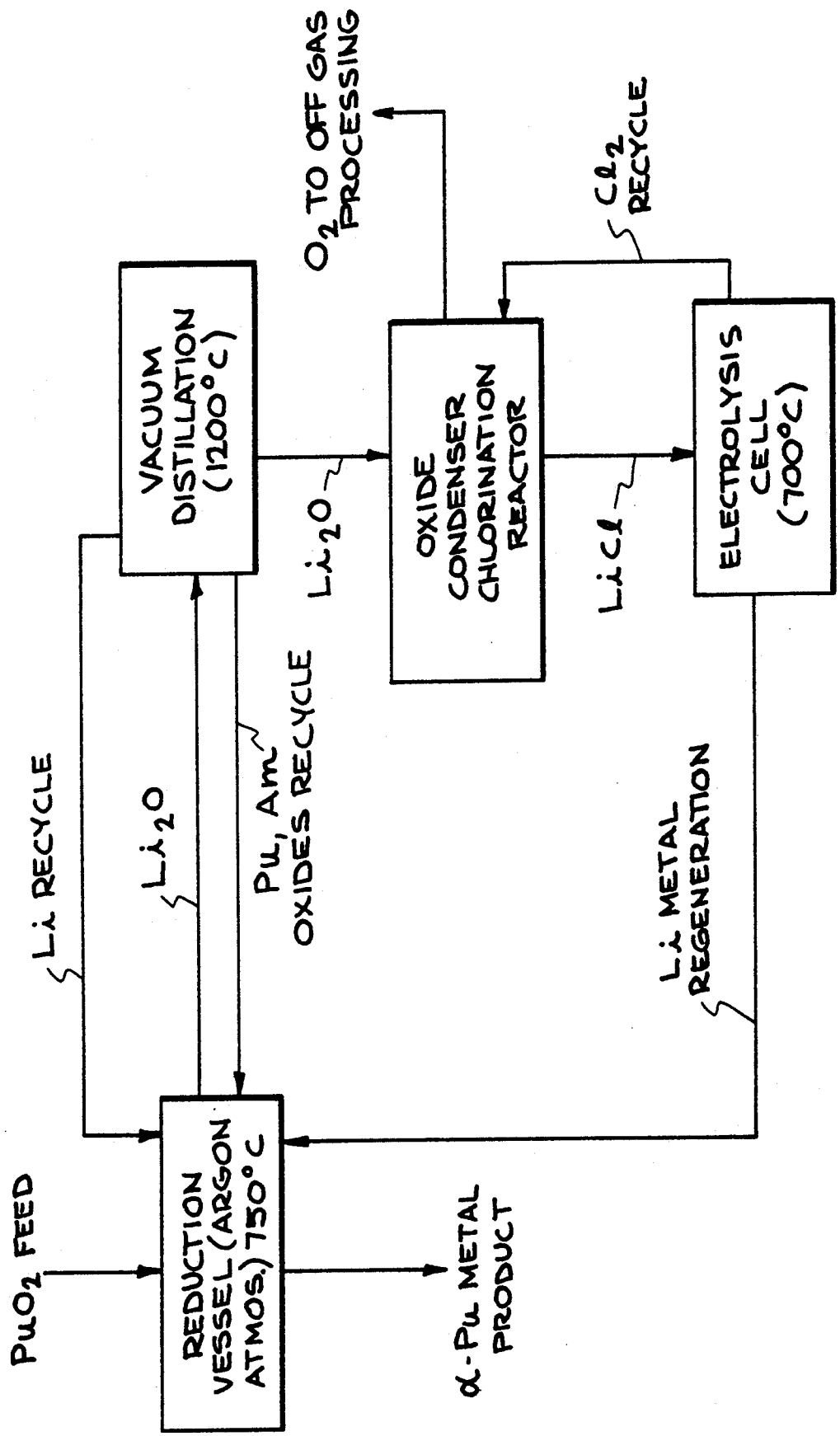
FIG. 1. Flow Diagram of Lithium Reduction of Plutonium Oxide to metal with Regeneration of Li Metal.

The subject invention is directed to a method for the chemical reduction of plutonium oxides. The process utilizes the concept of oxide reduction by a more reactive metallic element. This more reactive element is the alkali metal lithium. In the preferred mode, plutonium oxides are reduced to alpha plutonium metal. Alpha plutonium is the allotropic phase of plutonium which is stable at temperatures between room temperature and 122° C. Plutonium oxide ($PuO_2$) is reduced to the alpha metal by reaction with pure lithium metal, and the lithium metal is subsequently recovered by hydrochlorination and electrolysis of the $Li_2O$ by-product salt.

Although other techniques have been used to reduce actinide halides and halides of rare-earths (the lanthanide series of elements with atomic numbers 57-71 plus Sc and Y), in order to produce high purity metals, there is no information about the direct reduction of elemental oxides of actinides with either metallic lithium or binary alloys containing lithium. The thermodynamics of an exemplary reduction reaction, such as the reaction of plutonium compounds with lithium, project that the plutonium reduction reaction would be favorable at moderate temperatures, but it less favored at temperatures exceeding 1000° K.

The reaction conditions for reduction of plutonium oxides with lithium are selected so that at a temperature above the melting point of plutonium (640° C.), but preferably of less than 1000° C., the reaction is favorable for the formation of plutonium metal. In the preferred mode, plutonium metal is formed from lithium reduction of plutonium oxides at about 700°-800° C. When the temperature is in excess of 1200° C., the reverse reaction is favored, resulting in formation of plutonium metal oxide and volatile lithium. The pressure of the reaction chamber is in the range of about one-tenth to about one atmosphere. The reaction chamber may contain unreactive, inert gases such as argon, helium or like gases.

The plutonium metal product, (e.g. Pu) which melts at 640° C. and has a liquid density of 16 is more dense than the lithium and lithium oxides and coalesces into a pool of dense molten metal which may be siphoned from the bottom of the reaction vessel prior to distillation of $Li_2O$. Lithium metal is immiscible with molten plutonium and due to its lesser density it will float on top of the plutonium metal phase during siphoning operations.

Enriched $^6Li$ is preferred as the reductant metal because the threshold energy for neutron emission from $^6Li$ by alpha bombardment requires alpha particles that are more energetic than 6.6 MeV. The maximum alpha-particle energy emitted by any isotopes of Pu, Am, or Np that may be present in plutonium feeds is 5.5 MeV. It is therefore impossible to obtain neutron emission from $^6Li$ in contact with plutonium oxide feedstock. If the reductant lithium metal contains a significant abundance of $^7$Li, which has a threshold energy of 4.5 MeV, some (alpha, neutron) neutrons will be emitted. Since this process recycles all of the reagents used in the reduction step, only highly enriched $^6$Li isotope would be used in the chemical process for plutonium-oxide reduction.

In the preferred mode for the reduction of plutonium oxide, $PuO_2$, reaction conditions are selected with a temperature of less than 1000° K. in order to favor formation of plutonium metal. The plutonium metal melts at 640° C., and due to its greater density of 16, plutonium metal will coalesce into a pool at the bottom of the reaction vessel, from which it may be siphoned away from the reaction mixture as a liquid product. Lithium metal and $Li_2O$ remaining in the reaction mixture are distilled off as they readily sublime at 1200° C. (1473° K.) under a good commercial vacuum of less than 1.0 mPa.

The lithium reduction method permits metal formation with recycling of the reductant by-products, which minimizes the chemical waste formation. Lithium oxide by-product is reclaimed by sublimation, and after chlorination to the chloride salt, lithium may be recovered. The molten lithium chloride is decomposed to lithium metal by electrolysis and metallic lithium is recovered for reuse. (FIG. 1)

In an alternate mode, suitable solvent metals may be added to the chemical reduction of plutonium oxides to promote phase separation of the salt and alloy phases. A solvent metal is a liquid metal which dissolves another substance or solute. Solvent metals with the properties of low vapor pressure, low melting point, high solubility for dissolving plutonium metal, including but not limited to zinc and cadmium, may be used. Zinc or cadmium may be used to improve the thermodynamics at lower temperatures, by lowering the activity coefficient of the plutonium metal. The metal phases are isolated by siphoning the liquid-metal phase from beneath the floating $Li + Li_2O$ salt. When solvent metals are used, the pure actinide metal may be recovered by vacuum retorting and recycling the recovered solvent metal to the next reduction stage. The recycling of lithium reductant and the zinc metal solvent permits the reduction of actinide metals without the production of huge quantities of reduction residues contaminated by actinides, such as those which are generated by the BR and DOR methods.

In particular, it was found that addition of a solvent metal will improve the reduction thermodynamics of plutonium at lower temperatures by forming a binary alloy with the Pu metal which reduces the activity coefficient of the product metal and lowers the free energy of the reaction. Zinc metal was selected as a solvent in the Li-Zn-Pu system, as thermodynamic calculations indicated that this solvent would enable driving the reduction reaction to completion at a temperature in the range of 500°-600° C.

Lithium Reduction of Plutonium

The instant invention discloses a novel method for the chemical reduction of plutonium oxides, to the metal with lithium metal vapor. The by-product of the reduction reaction, lithium oxide, in particular $Li_2O$, is reclaimed by sublimation of the $Li_2O$ after phase separation from the plutonium metal product by decantation, siphoning or the like. The sublimation step is performed after removal of the Pu metal phase from the reaction vessel. In the preferred mode of sublimation, the reaction vessel is evacuated to about 0.1 to 1.3 mPa pressure and the temperature raised to about 1200° C. The removal of lithium oxides by sublimation effectively decontaminates the $Li_2O$ fraction from any residual plutonium, americium, or neptunium metals.

Any trace actinide metals remaining trapped in the oxide interstices will be converted to oxide during distillation at about 1200° C. and remain in the bottoms fraction of the still. The bottom oxides are recycled to the next reduction feed. It is therefore not necessary to drive the reaction to completion, since unreduced oxides are returned to the reduction step as feed, and actinide metals are siphoned out of the reduction reactor as product.

$Li_2O$ may be recycled by an electrolysis process. Lithium oxide is hydrochlorinated with anhydrous HCl, and the resulting lithium chloride is electrolyzed to produce lithium metal and chlorine gas. The regenerated $^6$Li metal is recovered from the electrolysis cell and used as the reagent feed of successive plutonium oxide reduction steps. The chlorine gas recovered from the electrolysis cell is used to produce the hydrogen chloride needed to convert the $Li_2O$ to LiCl in the hydrochlorination step.

All reagents used in this process are recovered from the by-products formed during the reduction step. Therefore, this process produces no significant chemical waste products other than oxygen and heat liberated in the various chemical reactions.

In particular, the utility of this reduction method is demonstrated by examples of the reduction of plutonium oxides, either $Pu_2O_3$ or $PuO_2$ to the metal with lithium metal vapor. Any isotopic mixture of lithium metal may be used with equal chemical effect. Highly enriched $^6$Li isotope is selected in the preferred method, as it will not emit neutrons during the plutonium reduction reaction. This is possible in the particular example because the threshold reaction energy for (alpha, neutron) emission from $^6$Li is 6.6 MeV, and the alpha decay energy of the plutonium isotopes with americium impurities present is less than 5.5 MeV ($^{239}$Pu and $^{240}$Pu=5.15 MeV, $^{241}$Am=5.48 MeV alpha decay energy). The $Li_2O$ by-product of the reduction of plutonium is reclaimed by vacuum sublimation of $Li_2O$ at temperatures greater than about 1200° C. from residues remaining after decantation of the liquid metal fraction. The $^6$Li metal is reclaimed by sequential hydrochlorination and electrolysis of the $Li_2O$ fraction.

Small-scale laboratory experiments have demonstrated that pure $PuO_2$ can be reduced with lithium metal to form alpha-plutonium metal. Essentially complete reduction of the oxide was obtained with only a slight excess (5%) of reductant at temperatures ranging from about 500° C. to about 750° C. Plutonium metal was produced in a demonstration reduction of $PuO_2$ by reaction performed at 550° C. for 2 hours in small bore (¾ inch) vitrified magnesium oxide crucibles in a vacuum or in a helium atmosphere. X-ray analysis detected the presence of only alpha-Pu metal, but not $PuO_2$ and $Pu_2O_3$, which indicated that the reactions proceeded to near completion.

Lithium Reduction of Plutonium in Metal Solvent

Plutonium may be reduced with lithium metal in the presence of a metallic solvent. Solvent metals can improve reaction thermodynamics at higher temperatures by lowering the activity coefficient of the product metal and help drive the reaction to completion. When plutonium oxides are reacted with lithium-zinc reductant alloy, the liquid plutonium metal sinks to the bottom, where it can be siphoned off with the metal solvent.

In the preferred mode, plutonium oxide ($Pu_2O_3$ or $PuO_2$) is reacted with lithium-zinc reductant alloy at elevated temperatures, ranging from about 450° C. to about 600° C. Pu metal is formed as the free metal alloyed with zinc, and the $Li_2O$ product that is formed floats on the surface as a fine powder. Because of the low density of the $Li_2O$, the plutonium metal-solvent metal liquid phase fraction, in this example, Pu-Zn liquid phase fraction, sinks to the bottom of the crucible and may be siphoned off to a vacuum retort, leaving $Li_2O$ and unreacted plutonium oxide, $Pu_2O_3$ in this example, in the reaction crucible.

Pure Pu metal is recovered from the vacuum retort following distillation of the zinc (and any remaining lithium metal) at an elevated temperature greater than about 700° C. and low pressure (about 1.3 Pa). The zinc and lithium are captured by condensation and are reused in the next cycle of the reduction reaction. Pure plutonium metal remaining in the retort is siphoned from the retort vessel and chill-cast as a plutonium ingot.

The lithium oxide remaining in the reaction crucible after the initial reduction and removal of the plutonium metal is transferred to a high temperature vacuum retort where distillation, under the conditions of about 1200° C. to about 1400° C. and a pressure of about 0.1 mPa to about 1.0 mPa, produces Li and $Li_2O$ which are nearly free of actinide contamination. The Li metal can be recycled back to the next plutonium oxide reduction reaction, while the remaining lithium oxides are converted by hydrochlorination to LiCl which is then electrolyzed to $^6Li$ metal product for reuse as the reductant in the plutonium oxide reduction step.

The reduction process may be recycled indefinitely, without the necessity of driving the reduction step to completion, as any unreduced actinide oxide, such as $Pu_2O_3$, $Am_2O_3$ and $NpO_2$, is returned as feedstock in the succeeding cycle. Any Pu, Am and Np metals present during the $Li_2O$ sublimation at about 1200° C. are converted to oxides which do not sublime or distill. As such they are recycled as feedstock to the first step of the reduction sequence. There is no accumulation of waste products, other than heat. Trace quantities of metallic impurities present in the plutonium oxide feedstock are expected to remain in the same concentration in the product metal.

Figure 2:
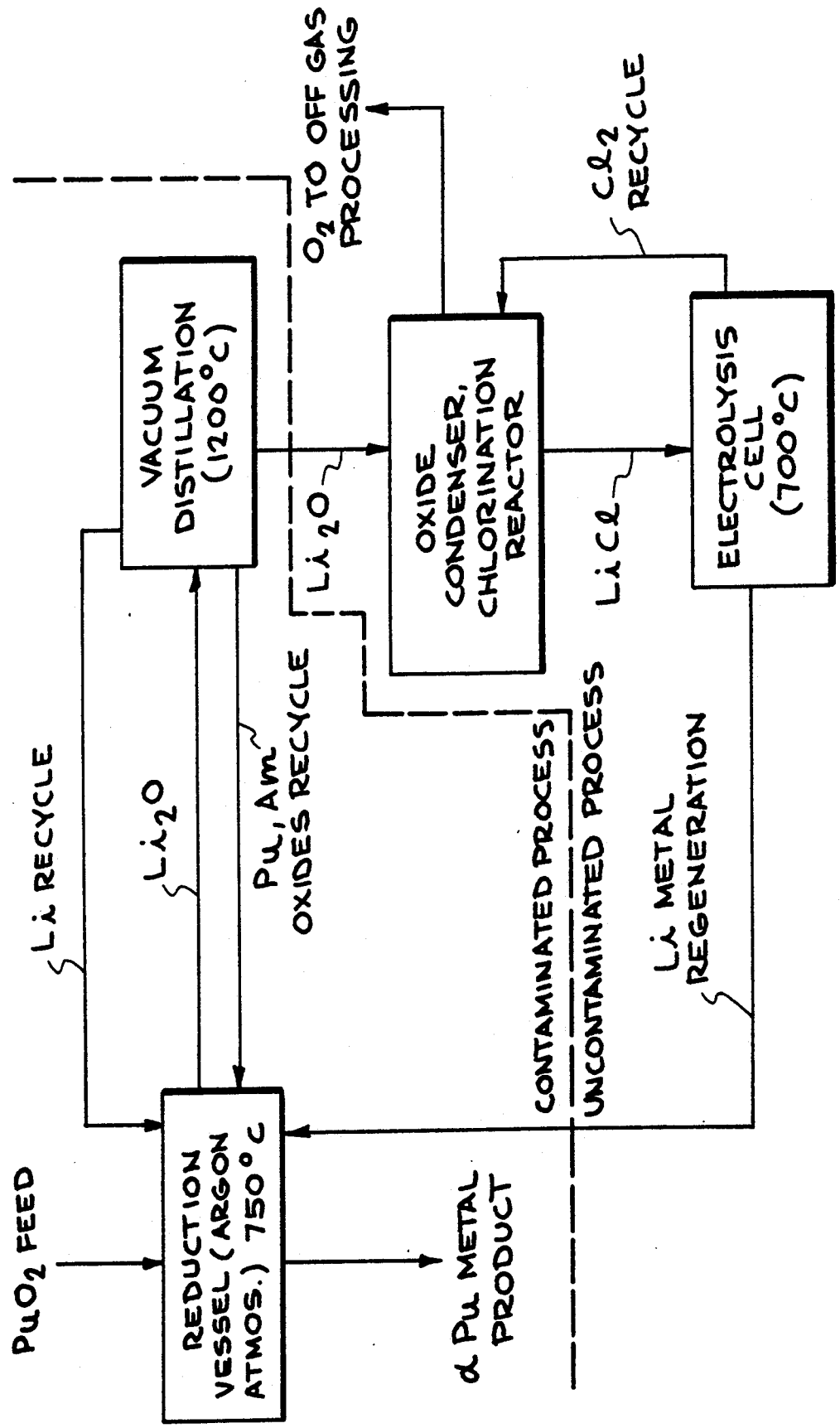
FIG. 2. Flow Diagram for alpha-Plutonium Metal Production with Uncontaminated Lithium Recycle Process.

Large volumes of liquid Pu metal can be made in production scale processing by the procedure for lithium reduction of plutonium oxides of the instant-invention. Reduced plutonium metal is separated from the reaction materials gravimetrically and is siphoned away. After plutonium removal, the lithium oxides are transferred to a vacuum distillation unit contained within an alpha-contaminated enclosure. The system condenser, which may be located outside of the contaminated enclosure (FIG. 2), permits collection of uncontaminated $Li_2O + Li$ product from the distillation. The lithium fraction product obtained by distillation is contacted with anhydrous HCl, derived from the electrolysis process, for conversion of $Li_2O$ to LiCl. The low melting LiCl is fed to the electrolysis unit where lithium metal is regenerated and chlorine by-product is produced. The lithium metal floats on the molten LiCl feed salt for recovery by decantation and is returned to the reduction vessel for reaction with more $PuO_2$ feedstock.

The following examples, presented by way of illustration, serve to explain the present invention in more detail. These examples are not construed as limiting the invention to the precise forms or modes disclosed. In fact, several improvements and modifications are possible. It is intended that such improvements and modifications are encompassed by the appended claims.

EXAMPLES

1. Lithium Reduction of Plutonium Oxides

Plutonium oxide ($Pu_2O$) was reacted with pure lithium metal. The lithium metal may be of any isotopic mixture, and in the preferred mode is highly enriched $^6Li$ isotope. The use of $^6Li$ isotope prevents neutron emission during the reduction reaction. The reactants were stochiometric quantities of high-fired $PuO_2$ (25 gm) and lithium metal (2.60 gm). The reaction was conducted in a ¾ inch bore vitrified MgO test tube reaction vessel which could be maintained at reduced pressure, in the range of about 0.9 Pa, and at high temperatures in the range of 500°-550° C. The pressure began to rise as the temperature climbed to 185° C., and reached a peak pressure of 4.0 Pa at 225° C. Thereafter, the pressure fell to about 0.7 Pa. The temperature was maintained at 500°-550° C. for two hours.

The cavity was opened, after cooling, and the MgO crucible was found to be cracked due to melt expansion in the lower region. The contents of the crucible were malleable and appeared to consist of one hard, continuous phase, a blend of shiny-metallic fines dispersed in a grey-salt matrix. Samples from four different regions were submitted to X-ray analysis. Assay of the metal composition revealed that all samples were identical, and contained only alpha-plutonium metal and $Li_2O$ reaction product. There were no starting reactants or other oxides present. This was unexpected, as thermodynamic calculations based on the published literature, would have predicted incomplete reduction at 500° C. (773° K.).

After preliminary X-ray analysis, the cermet ingot was sawed in half vertically, placed in a new MgO crucible and returned to the furnace cavity for further heating (two hours at 690° C. at 0.7 Pa). After removal from the furnace cavity, the specimen had not melted nor changed shape from the original configuration, but small beads of metal had accumulated on the surface of the reaction specimen. When the beads and the cermet were subjected to further X-ray analysis, the cermet proved to be identical in composition with the original reaction reagents, while the extruded beads (about 130 mg mass per bead) were pure alpha-plutonium metal.

2. Lithium Reduction of Plutonium Oxides in Helium Atmosphere at Higher Temperatures A sample of $PuO_2$ (24.5 gm) and lithium metal (2.58 gm) were reacted in a ¾ inch MgO crucible in a helium atmosphere, at about 1/7 atmosphere pressure, as the furnace temperature increased to 250° C. The crucible temperature was further raised to 750° C., held at that temperature for 2 hours, and then cooled rapidly in an attempt to freeze-in any intermediate reaction products that might be present.

The MgO crucible was again cracked and the cermet sawed vertically through the axis to identify any phase separation of reaction products. The upper ⅛ of the cermet appeared to be a fine-grained solid material ranging to a fluffy powder at the top; the lower ⅜ appeared to be a dense but porous structure, with the voids being filled with a somewhat softer material of the same color. X-ray analysis showed that the upper powder consisted of PuO and Li$_2$O with some product alpha-Pu present. The lower sample was primarily alpha-Pu with some Li$_2$O present. It was believed that the incomplete reaction of the starting reagents was due to incomplete mixing of the plutonium oxides and the Li metal.

These reactions were performed with unmixed samples wherein lithium metal foil was laid on top of PuO$_2$ in the reaction crucible. The presence of PuO in the upper phase is consistent with there being an unsufficiency of lithium present during the reaction, possibly due to lithium evaporation into the furnace at the low helium pressure present (1/7 atmosphere He, 750° C.).

There was little improvement in the partial reduction of plutonium oxides, by the addition of a fluxing salt (LiCl) to improve the phase separation between Li$_2$O and Pu metal. The mixing of low-melting solvent salt, LiCl, with the PuO$_2$ feedstock, in a ratio of 2 LiCl-:PuO$_2$, and heated to 730° C. for two hours, was tried to improve reaction of the oxides. An extended heat soak of incomplete reaction products by heating to 730° C. for 20 hours, in a pure helium atmosphere, also did little to improve coalescence of already formed plutonium metal.

3. Plutonium Oxide Reduction with Excess Lithium

PuO$_2$ was reacted with a four-fold excess of metallic lithium foil. Lithium metal foil was placed in the crucible, and PuO$_2$ was placed in a lithium foil pan positioned above the oxide in the crucible. The reaction was started in a vacuum, and when the temperature was at 250° C., the furnace cavity was back-filled with 1 atmosphere of helium. The furnace temperature was brought to 735° C. for 2 hours, and cooled reasonably rapidly (furnace door opened). The inner crucible was cracked with a bulge from Pu metal solidification and a large gas void was discovered below the lithium bridge between two isolated melt regions. Alpha-plutonium metal was produced from Li reduction and the lithium bridge was supported by the gas bubble that had formed. The lithium melt was unsuitable for making capillaries for X-ray analysis, so an alternate analysis technique was used. The lithium alloy was dissolved in aqueous NH$_4$Cl solution (pH=5), under a nitrogen atmosphere, and the powdered residue was examined by X-ray analysis. Although there was some reformation of PuO$_2$ due to oxidation during a protracted wait for analysis, the residue was primarily alpha-Pu metal powder with some PuO$_2$ present. This suggested an alternate approach to recovery of plutonium from cermets of lithium, Li$_2$O and plutonium metal, whereby alpha plutonium powder could be recovered by filtration of remaining LiCl solution and lithium chloride product could be recovered by evaporation of the filtrate and used as feed in the subsequent electrolysis to produce lithium metal.

4. Mechanical Mixing During Reduction of Plutonium Oxides

The reactor was modified to add a mechanical stirring device to the reaction crucible. A simple "O"-ring sealed-shaft rotary stirrer unit was added to a tantalum paddle so that the stirrer could be positioned vertically, and rotated manually. The reactants were PuO$_2$ with a 3-fold excess of lithium metal (12.3 gm of PuO$_2$ and 8.72 gm of Li). Due to mechanical complications, the reactor was filled with high purity argon from the glovebox atmosphere. As the temperature was increased the furnace temperature experienced an endotherm at 215° C., at which time the stirrer dropped deeper into the crucible due to the melting of the lithium metal foil. There was an exotherm at 315° C. which resulted in an excursion to 370° C. As the heating and stirring proceeded, a thick sediment layer, ¼ to ⅜ inch thick, formed at the bottom of the crucible, which was assumed to be plutonium powder from the reduction of PuO$_2$. This sediment, which was noted at 680° C., gradually liquified before the temperature recorder indicated 693° C. It was assumed that this effect was due to melting of plutonium metal (640° C.). Manual stirring was continued for the next one and one-half hours, when the furnace was turned off and allowed to cool for about 12 hours. The crucible was cracked and the melt was sectioned vertically.

It was apparent that a large bead of plutonium metal had formed at the lowest part of the crucible. The Li+-Li$_2$O formed a viscous mixture which seemed to prevent plutonium from coalescing into a puddle. X-ray reflectance analysis indicated that only the bottom section of the melt contained significant amounts of alpha-plutonium metal, mixed with some Li$_2$O and Li. The upper two layers contained only Li and Li+Li$_2$O. This laboratory-scale production confirmed that pure plutonium metal can be retrieved from the gravitational phase separation of a well stirred reduction of plutonium oxide carried out with excess lithium metal.

5. Production Process for Lithium Reduction of Plutonium Oxide

In scaling up the reactions of lithium reduction of plutonium oxides for production-scale operation, it is proposed that dry plutonium oxide, PuO$_2$, is fed into a heated V-bottom tungsten reaction vessel in a totally inert argon-atmosphere containment box. The vessel is equipped for mechanical stirring and vacuum siphoning of the liquid metal from the primary vessel. The reduction operation is carried out at 700°–750° C. at atmospheric pressure for a period of about 15 minutes with vigorous stirring, followed by a settling period (about 45 minutes) to permit gravitational stratification of the product phases. The liquid metal product is drawn off by vacuum transfer through a resistance-heated tantalum siphon tube which is lowered into the reaction vessel. The liquid plutonium is chill-cast into foundry ingots. The lithium metal and lithium oxide remaining in the crucible are transferred by placing the intact crucible into a vacuum-still unit. The distillation assembly is connected by heated-jacket baffled fractionation lines to two separate condensers, one for lithium metal and one for Li$_2$O.

Following distillation recovery of Li and Li$_2$O, the tungsten reaction vessel, which contains the actinide residue fraction (Pu$_2$O$_3$, Am$_2$O$_3$, NpO$_2$), is returned to the furnace. The reaction vessel is recharged with Pu$_2$O to initiate the second cycle.

The lithium-oxide fraction is converted to LiCl by anhydrous HCl treatment. The low melting LiCl salt is fed into the electrolysis unit, where lithium metal is produced and chlorine is recovered as a by-product. The lithium floats on the molten LiCl feed salt and is recovered by decanting for use in further plutonium oxide reduction steps. Chlorine offgas is reacted with hydrogen in a catalytic recombiner and is condensed as anhydrous hydrogen chloride (HCl). This can be recycled back to the Li$_2$O chlorination step.

6. Plutonium Oxide Reduction in a Metal Solvent

Plutonium metal oxides, either Pu$_2$O$_3$ or Pu$_2$O, are placed in a MgO reaction vessel with lithium metal and zinc metal. The reaction mixture is stirred and heated to about 500° C. The lithium oxide, Li$_2$O, formed in the reaction floats on top of the more dense Zn-Pu liquid phase as the temperature is elevated past the melting point of Zn, 420° C. The liquid metals are siphoned off into a vacuum retort, leaving lithium oxide and any unreacted plutonium oxide.

The liquid metal phase Pu-Zn is heated in the vacuum retort to remove the solvent zinc from the plutonium metal. When the retort is heated to above 700° C. at atmospheric pressure, zinc can be removed as vapor and recovered for reuse; the dense liquid pure plutonium metal is withdrawn from the bottom of the retort and cast as ingot product.

The lithium metal and Li$_2$O are recovered from the reaction mixture as described above by heating the low density floating powder in a high temperature vacuum retort to a temperature of 1200°-1400° C. under vacuum of less than 1.0 mPa. The distilled Li metal and Li$_2$O are free of actinide contamination. Lithium metal is returned to the next plutonium oxide reduction cycle. Lithium metal is recovered from the Li$_2$O by reaction with andydrous HCl followed by electrolysis. Any Pu, Am and Np metals which remain after Zn-Pu siphoning are converted to oxides which do not sublime or distill with the Li$_2$O. These oxides are recycled back onto the reduction sequence.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A method for production of plutonium metal from plutonium oxide, comprising the steps of:
   reacting a mixture consisting essentially of said plutonium oxide with metallic lithium; and
   removing pure liquid plutonium metal from product lithium oxides and unreacted lithium.

2. A method as in claim 1, wherein said reacting step is performed at a temperature of 700°-750° C.

3. A method as in claim 1, wherein said reacting step is performed in an atmosphere of inert gas at a pressure of about one atmosphere.

4. A method as in claim 1, wherein said removing step is by withdrawal of the density stratification layer formed, which is of the greatest density material, following reaction of plutonium oxide with metallic lithium.

5. A method for production of plutonium metal from plutonium oxide by metallic lithium reduction, with regeneration of lithium reactant, comprising the steps of:
   reacting said plutonium oxide with metallic lithium; oxides and unreacted lithium;
   subliming said product lithium oxide and unreacted lithium from unreacted plutonium oxide with hihg heat and low pressure;
   recapturing said product lithium oxides;
   reacting said recaptured product lithium oxides with anhydrous hydrochloric acid to produce lithium chloride salt; and
   decomposing product lithium chloride salt by electrolysis to regenerate lithium metal.

6. A method for the production of plutonium metal from plutonium oxide as in claim 5, wherein said reacting step of plutonium oxide with metallic lithium is performed at a temperature of 700°-750° C.

7. A method for production of plutonium metal from plutonium oxide as in claim 5, wherein the reacting step of said plutonium oxide with metallic lithium is performed in an atmosphere of inert gas at a pressure of about $9.8 \times 10^2$ Pa to about $9.8 \times 10^4$ Pa.

8. A method for production of plutonium metal from plutonium oxide as in claim 5, wherein sublimination of said recaptured product lithium oxides and lithium occur at about 1200° C. and a pressure of about $1.3 \times 10^{-4}$ Pa.

9. A method for production of plutonium metal from plutonium oxide by lithium reduction in a metal solvent, comprising the steps of:
   reacting said plutonium oxide with a solution of liquid lithium and solvent metal;
   draining liquid solvent metal containing product plutonium metal away from product lithium oxides and unreacted lithium; and
   removing solvent metal from liquid plutonium metal and solvent metal solution by vacuum distillation.

10. A method for production of plutonium metal as in claim 9, wherein said solvent metal is zinc.

11. A method for production of plutonium metal from plutonium oxide by lithium reduction in a metal solvent as in claim 9, with regeneration of lithium reductant, additionally comprising the steps of:
   subliming said product lithium oxides and unreacted lithium from unreacted plutonium oxides with high heat and low pressure;
   recapturing said product lithium oxides;
   reacting said recaptured product lithium oxides with anhydrous hydrochloric acid to produce lithium chloride salt; and
   decomposing product lithium cloride salt be electrolysis to regenerate lithium metal.

12. A method for production of plutonium metal as in claim 11, wherein said solvent metal is zinc.

* * * * *